(12) United States Patent
Wu

(10) Patent No.: US 6,700,215 B2
(45) Date of Patent: Mar. 2, 2004

(54) MULTIPLE INSTALLATION VARIE GATED GENERATORS FOR FOSSIL FUEL-AND ELECTRIC-POWERED VEHICLES

(76) Inventor: Shiang-Huei Wu, No. 343, Sec. 1, Chung-Shan Road, Chang-Hua City (TW)

(*) Notice: Subject to any disclaimer, the term of this patent is extended or adjusted under 35 U.S.C. 154(b) by 144 days.

(21) Appl. No.: 09/956,948

(22) Filed: Sep. 21, 2001

(65) Prior Publication Data

US 2003/0057707 A1 Mar. 27, 2003

(51) Int. Cl.⁷ ............................. F03D 9/00; H02P 9/04
(52) U.S. Cl. .................................... 290/44; 290/55
(58) Field of Search .................. 180/165, 65; 320/61, 320/101; 290/44, 55, 54

(56) References Cited

U.S. PATENT DOCUMENTS

| | | | | |
|---|---|---|---|---|
| 3,876,925 A | * | 4/1975 | Stoeckert | 322/1 |
| 4,075,545 A | * | 2/1978 | Haberer | 322/35 |
| 4,134,469 A | * | 1/1979 | Davis | 180/2.2 |
| 4,179,007 A | * | 12/1979 | Howe | 180/2.2 |
| 4,254,843 A | * | 3/1981 | Han et al. | 180/165 |
| 4,314,160 A | * | 2/1982 | Boodman et al. | 290/55 |
| 4,424,452 A | * | 1/1984 | Francis | 290/55 |
| 4,753,078 A | * | 6/1988 | Gardner, Jr. | 60/668 |
| 5,141,173 A | * | 8/1992 | Lay | 244/2 |
| 5,280,827 A | * | 1/1994 | Taylor et al. | 180/165 |
| 5,287,004 A | * | 2/1994 | Finley | 290/55 |
| 5,384,521 A | * | 1/1995 | Coe | 318/161 |
| 5,680,032 A | * | 10/1997 | Pena | 290/52 |
| 5,746,283 A | * | 5/1998 | Brighton | 180/65.3 |
| 5,850,108 A | * | 12/1998 | Bernard | 290/54 |
| 5,920,127 A | * | 7/1999 | Damron et al. | 290/44 |
| 5,986,429 A | * | 11/1999 | Mula, Jr. | 320/101 |
| 6,373,145 B1 | * | 4/2002 | Hamrick | 290/44 |
| 6,387,007 B1 | * | 5/2002 | Fini, Jr. | 475/268 |

* cited by examiner

Primary Examiner—Nicholas Ponomarenko
Assistant Examiner—Julio C. Gonzalez
(74) Attorney, Agent, or Firm—Troxell Law Office PLLC

(57) ABSTRACT

Generators for use with a fossil fuel- and electric-powered vehicle having a plurality of different types of generator units mounted on a vehicle to supplement the power supply of the vehicle. Propeller generator units and turbine generator units utilize the force of oncoming wind to output electricity. The rolling wheel generator units consist of installing an additional fifth wheel, sixth wheel, seventh wheel, and eighth wheel of a dedicated generator roller wheel set on any of the main wheel axles disposed on the vehicle undercarriage such that by circumvolution around the axle when the vehicle is proceeding forward, the additionally installed generator roller wheel set rotates generator to produce electricity. A matching rectifier center caches the electric power produced by each generator unit and, following accumulation, directly supplies electricity to the vehicle or recharges its storage battery.

3 Claims, 4 Drawing Sheets

FIG3-A

MULTIPLE INSTALLATION VARIE GATED GENERATORS FOR FOSSIL FUEL- AND ELECTRIC-POWERED VEHICLES

BACKGROUND OF THE INVENTION

1) Field of the Invention

The invention herein relates to multiple installation variegated generators for fossil fuel- and electric-powered vehicles comprised of a plurality of different type generator units mounted at various areas on a vehicle that supplement the power supply of the vehicle, with the generators producing more electricity as the speed of a vehicle so-equipped increases; as such, the present invention is capable of providing even more additional electricity to supplement the power supplies of fossil fuel- and electric-powered vehicles such that they comply with future environmental protection goals.

2) Description of the Prior Art

As the ozone layer continues to grow thinner, the accompanying greenhouse effect has had a serious impact on the environment, with the air polluting emissions of automobiles and motorcycles cited as among the leading causes of the phenomenon. As a result, electric-powered vehicles that do not utilize fossil fuels have become a trend. Conventional electric-powered vehicles rely on storage battery-energized motors for operation and supplementing the electricity consumed is problematic. Storage batteries are expensive, heavy, and a large quantity of them must be utilized and, furthermore, since the electricity in storage batteries is gradually consumed during usage, after an electric-powered vehicle is drive a certain distance, the batteries require recharging if operation is to be continued. As such, electric-powered vehicles not only have a short driving range, but are relatively heavy vehicles. Furthermore, electric-power vehicles are high priced and widespread usage will prove difficult. The generator units of the invention herein are generators of different types that are capable of utilization on vehicle having fossil fuel engines, vehicles having fossil fuel engine and electric motor hybrid systems, and vehicles having electric motors.

SUMMARY OF THE INVENTION

The primary objective of the invention herein is to provide multiple installation variegated generators for fossil fuel- and electric-powered vehicles comprises of a plurality of different type generator units mounted at various areas on a vehicle that supplements the power supply the vehicle, wherein the propeller-type generator units and, the turbine-type generator units utilize the force of oncoming wind when a vehicle so-equipped is proceeding forward such that the rotation of the spinning propeller and turbine blades is transferred to generators that output electricity. The rolling wheel-type generator units consists of installing an additional fifth wheel, sixth wheel, seventh wheel, and eighth wheel (comprising a dedicated generator roller wheel set) only of the main wheel axles disposed on the vehicle undercarriage such that by circumvolution around the axle when the vehicle is proceeding forward, the additionally installed wheels rotate generators to product electricity. A matching rectifier center situated at an appropriate area of the vehicle caches the electric power produced by each generator unit and, following accumulation, directly supplies electricity to the vehicle or recharges its storage battery. Furthermore, since the generator units rotate faster as the speed of the vehicle increases, greater amount of electricity is generated and, as such, save energy and minimize pollution.

Another objective of the invention herein is to provide multiple installation variegated generators for fossil fuel- and electric-powered vehicles, wherein the generator units of the invention herein are installable on fossil fuel engine vehicles, fossil fuel engine and electric motor hybrid system vehicles, and electric motor vehicles, wherein as utilized on fossil fuel engine vehicles, the hydrogen and oxygen broken down through distilled water electrolysis during power supply supplementation becomes the basis of hydrogen and oxygen fuel cell that can drive a motorized compressor system conditional for an enhanced compression fossil fuel engine; when utilized on fossil fuel engine and electric motor hybrid system vehicles, the power supply supplementation provides the electricity required by the systems of the said vehicles such as electric motors and storage batteries.

To enable a further understanding of the structure, innovative features, functions, and other objective of the invention herein, the brief description of the drawings below are following by the detailed description of the invention herein.

BRIEF DESCRIPTION OF THE DRAWINGS

FIG. 3-A is an orthographic drawing the of the rolling wheel-type generator of the invention herein.

DETAILED DESCRIPTION OF THE INVENTION

Figure 1:
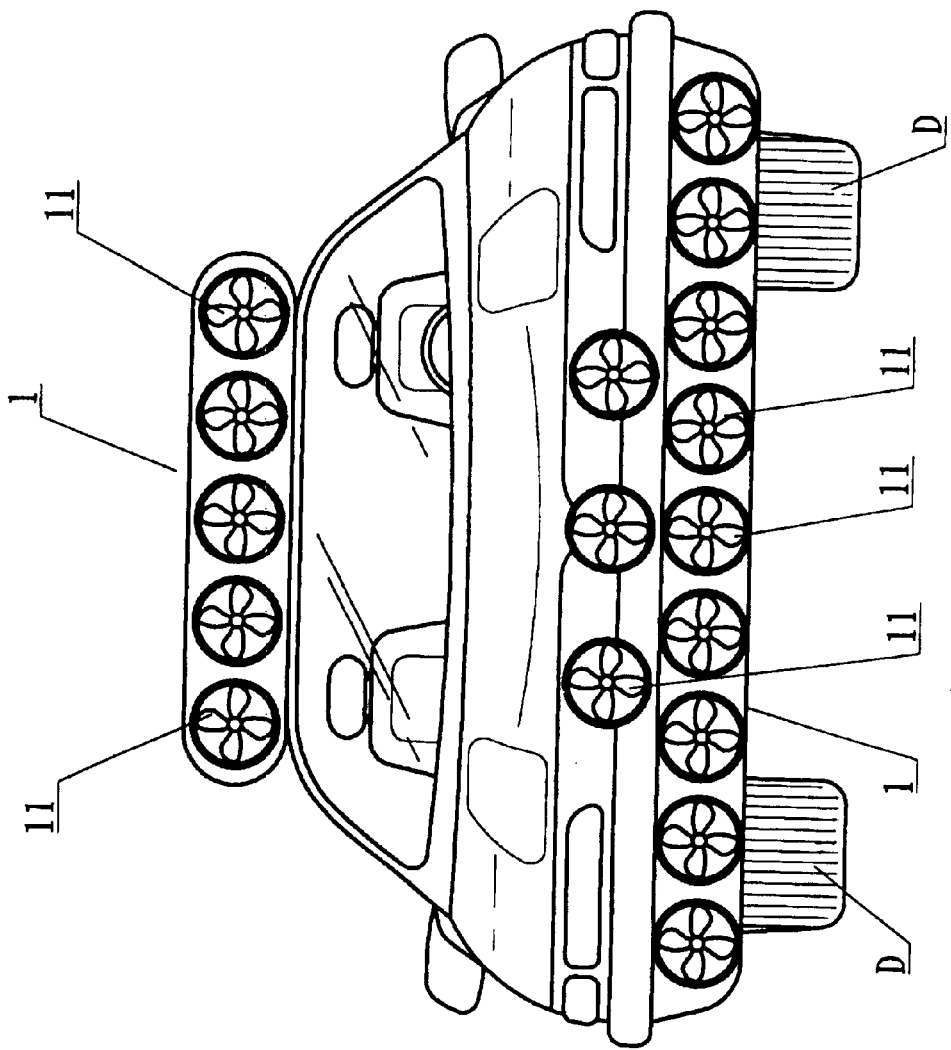
FIG. 1 is an orthographic drawing of the propeller-type generator units of the invention herein.
Figure 2:
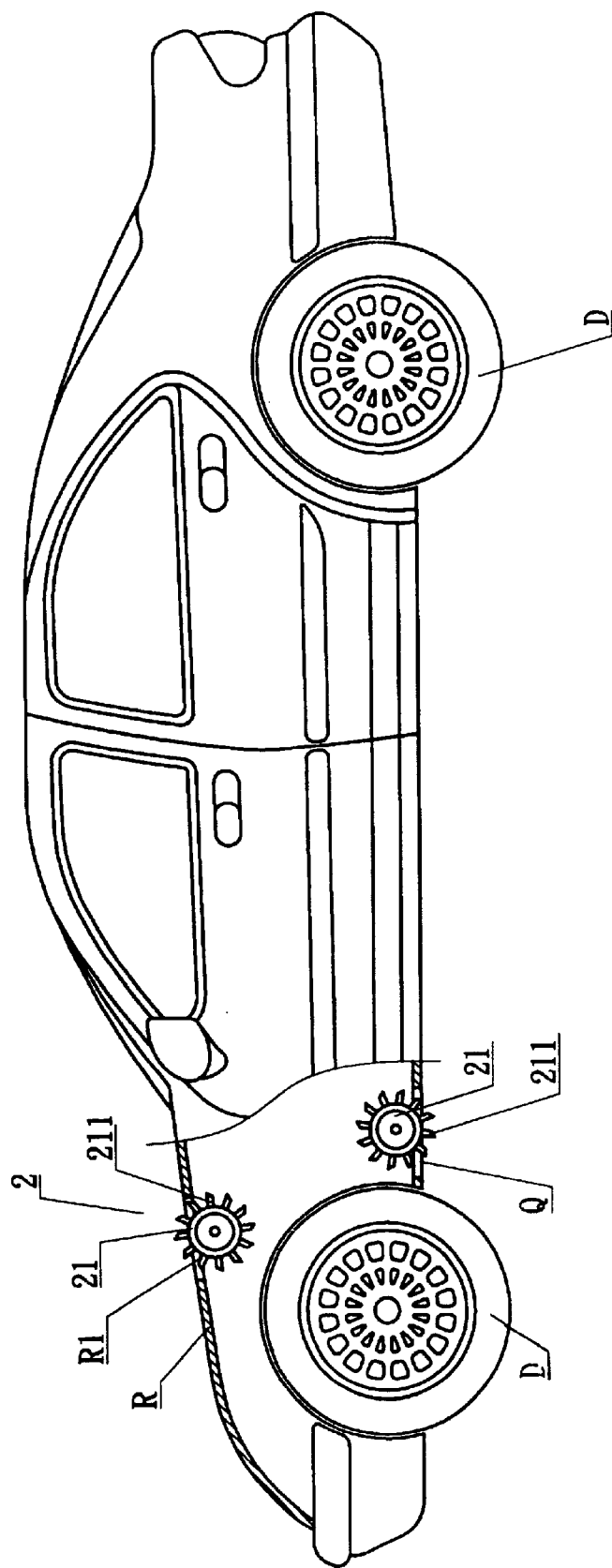
FIG. 2 is an orthographic drawing of the turbine-type generator units of the invention herein.
Figure 3:
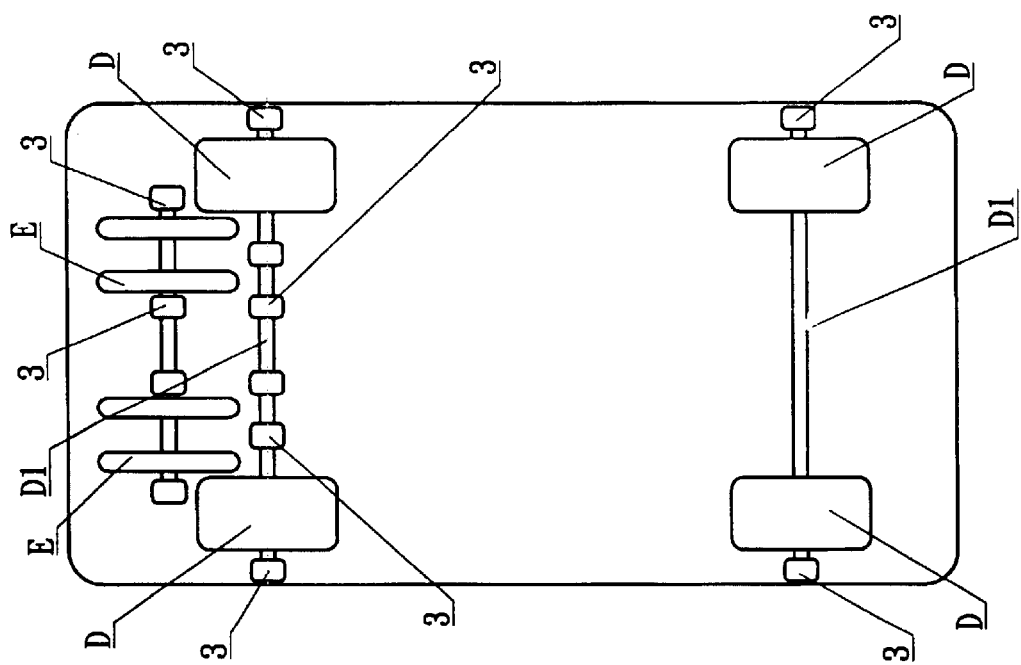
FIG. 3 is an orthographic drawing the rolling wheel-type generator units of the invention herein.
Figure 3:
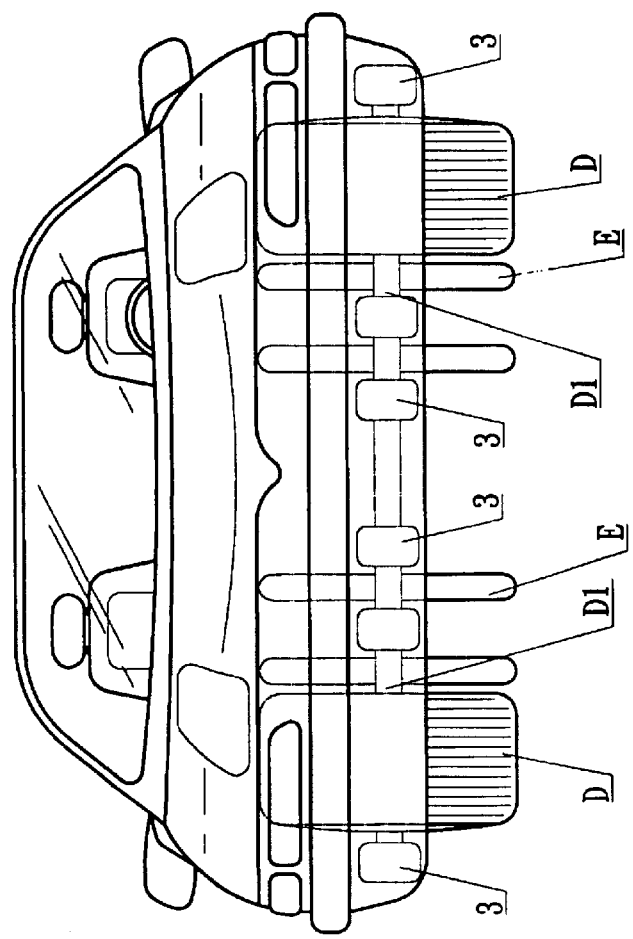

Referring to FIG. 1, FIG. 2, and FIG. 3, the structural arrangement of the invention herein is comprised of a plurality of different type generator units mounted at various positions on a vehicle that supplement the power supply of the vehicle, in which:

The propeller-type generator units 1 consist of a plurality consecutively mounted in an array along the section of the vehicle facing into the wind (for example, along the roof or between and below the two front head lamps of the vehicle) such that when the vehicle is proceeding forward, the wind force transversely encountered spins the blades 11 which then rotate the generators 12 to produce electricity.

The turbine-type generator units 2 consist of first forming openings R1 in the engine hood R and then installing the turbine-type generator units 2 at the lower extent of the openings R1 with a portion of the turbine-type generator 21 blades 211 protruding out of the engine hood R such that when the vehicle is driven forward, wind current spins the blades 211 which then rotate the turbine-type generators 21 to produce electricity; in addition, openings Q can also be formed in the chassis, the turbine-type generators 21 are then mounted in the openings Q and, furthermore, with the blades 211 of the turbine-type generators 21 protruding from the lower extent of the chassis such that when the vehicle is driven forward, wind current spins the blades 211 which then rotate the turbine-type generators 21 to produce electricity.

The rolling wheel-type generator units 3 consist of installing an additional fifth wheel, sixth wheel, seventh wheel, and eighth wheel of a dedicated generator roller wheel set E on any of the main wheel axles (such as axle D1 of the wheels D) disposed on the vehicle undercarriage such that by circumvolution around the axle when the vehicle is proceeding forward, the additionally installed generator roller wheel set E rotates generators to produce electricity.

Additionally, a rectifier center 4 situated at an appropriate area of the vehicle caches the electric power produced by each generator units and, following accumulation, directly supplies electricity to the vehicle or recharges its storage battery; furthermore, since the generator units rotate faster as the speed of the vehicle increases, a greater amount of electricity is generated thereby and, as such, the multiple installation variegated generators for fossil fuel- and electric-powered vehicles of the invention herein saves energy and minimizes pollution.

Figure 4:
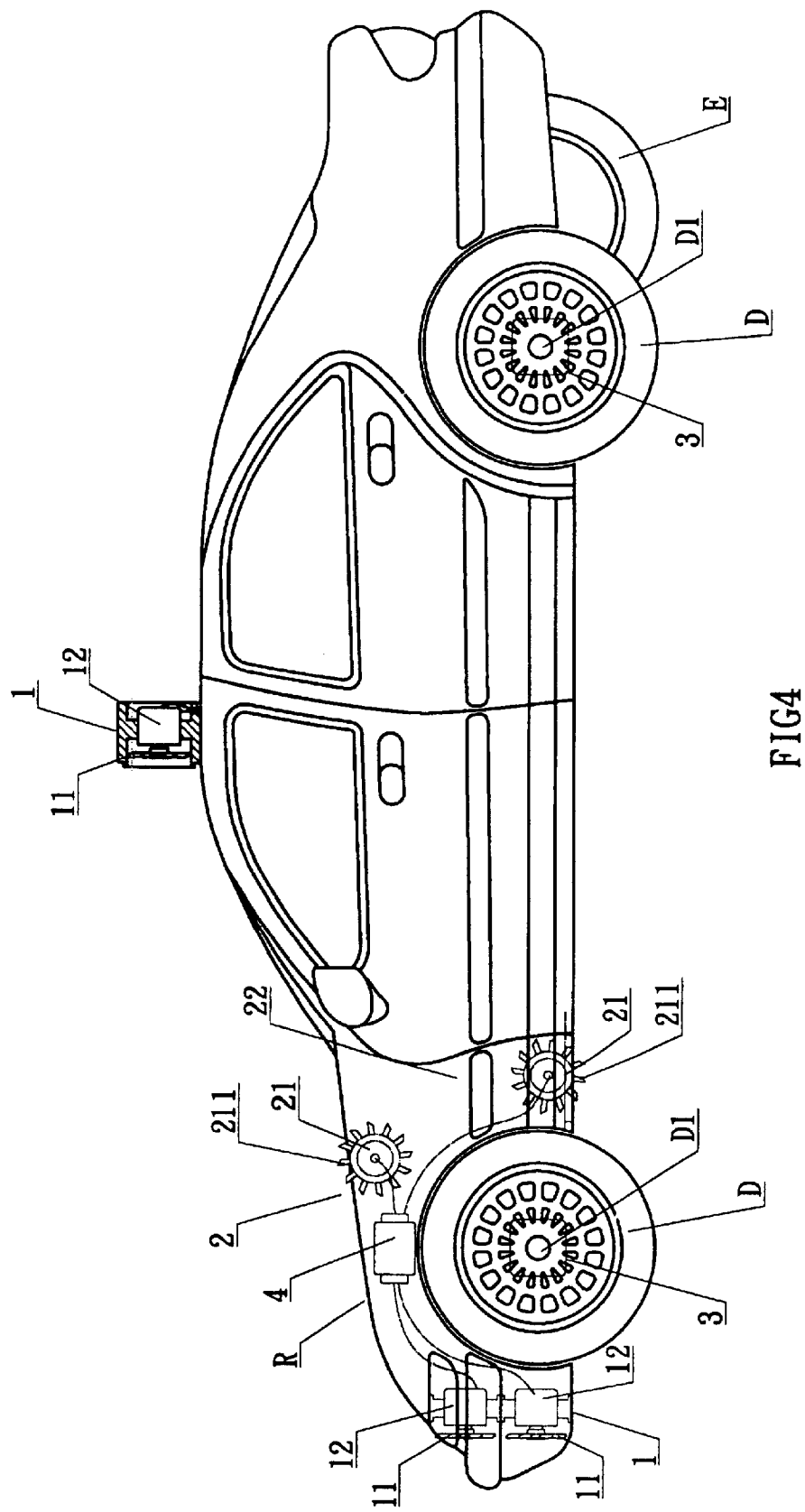
FIG. 4 is an orthographic drawing of the various generators of the invention herein installed on a vehicle.

Referring to FIG. 4, the drawing of an embodiment of the invention herein in which generator units are distributively installed at six areas of the vehicle, each said area has the same quantity of generator units mounted to provide for a larger volume of generated electricity.

The propeller-type generator units, the turbine-type generator units, and the rolling wheel-type generator unit can be installed in an arrangement having a single type of generator unit or an arrangement having a combination of generator unit types installed on the fossil fuel- and electric-powered vehicle.

The generator units of the invention herein are installable on fossil fuel engine vehicles, fossil fuel engine and electric motor hybrid system vehicles, and electric motor vehicles, wherein as utilized on fossil fuel engine vehicles, the hydrogen and oxygen broken down through distilled water electrolysis during power supply supplementation becomes the basis of a hydrogen and oxygen fuel cell that can drive a motorized compressor system conditional for an enhanced compression fossil fuel engine; when utilized on fossil fuel engine and electric motor hybrid system vehicles, the power supply supplementation provides the electricity required by the systems of the said vehicles such as electric motors and storage batteries.

What is claimed is:

1. Generator system for use with a fossil fuel and electric powered vehicle comprising:
    a) a plurality of propeller generator units connected on a roof and adjacent to front headlights of the vehicle, each of the propeller generator units having a propeller blade and a generator, each propeller blade being connected to one generator such that a wind force produced as the vehicle moves will turn the propeller blades and the connected generators to produce electricity;
    b) a plurality of turbine generator units connected in and protruding from an opening in a hood and an opening in a chassis of the vehicle, each of the turbine generator units having a turbine blade and a turbine generator, each turbine blade being connected to one turbine generator such that the wind force produced as the vehicle moves will turn the turbine blades and the connected turbine generators to produce electricity; and,
    c) a plurality of rolling wheel generator units connected to a plurality of axles on an undercarriage of the vehicle, at least one of the plurality of rolling wheel generator units having a wheel, such that movement of the vehicle will cause the plurality of axles to rotate and the plurality of axles will rotate the rolling wheel generator units to produce electricity.

2. The generator system for use with fossil fuel and electric powered vehicles according to claim 1, wherein the rolling wheel generator units having a wheel includes four rolling wheel generator units each having a wheel, the four rolling wheel generator units each having a wheel axially mounted on an axle positioned behind rear wheels of the vehicle, such that each wheel rotates as the vehicles moves land the rotation of the wheels turns the rolling wheels generator units to produce electricity.

3. The generator system for use with fossil fuel and electric powered vehicles according claim 1, wherein the plurality of generator units are connected to a rectifier center, such that the rectifier center supplies electricity to the vehicle.

* * * * *